United States Patent

[11] 3,626,008

[72] Inventors Hans Rudolf Biland
Basel;
Christian Luethi, Meunchenstein; Max Duennenberger, Frenkendorf, all of Switzerland
[21] Appl. No. 712,943
[22] Filed Mar. 14, 1968
[45] Patented Dec. 7, 1971
[73] Assignee Ciba Limited
Basel, Switzerland
[32] Priority Mar. 20, 1967
[33] Switzerland
[31] 4012/67

[54] NOVEL PHENYL AND NAPHTHALENE SUBSTITUTED OXALIC ACID DIAMIDES USEFUL AS PROTECTION AGENTS AGAINST ULTRAVIOLET IRRADIATION
4 Claims, No Drawings

[52] U.S. Cl. ................................................ 260/559,
260/45.8, 260/45.9, 260/247.2, 260/294,
260/398.5, 260/465, 260/471, 260/476, 260/482,
260/488, 260/507, 260/508, 260/519, 260/553,
260/556, 260/571, 260/574, 260/575, 260/578,
260/864, 96/115, 8/74, 8/85, 8/94.1, 8/73, 8/94,
8/14, 8/94.18, 8/165, 8/171, 8/172, 117/121,
117/123, 117/138.5, 117/138.8, 117/139,
117/141, 117/142, 117/144, 117/146, 117/147,
117/154, 252/8.8, 252/155, 252/403, 252/522,
424/38, 424/16, 424/59, 424/69, 424/63
[51] Int. Cl. ..................................................... C07c 103/33
[50] Field of Search .......................................... 260/559,
465, 556, 472, 518

[56] References Cited
UNITED STATES PATENTS
3,211,562 10/1965 Biland et al. ............... 260/45.9

*Primary Examiner*—Henry R. Jiles
*Assistant Examiner*—Harry I. Moatz
*Attorneys*—Harry Goldsmith, Joseph G. Kolodny, Bryant W. Brennan and Edward J. Sites ABSTRACT: The present invention provides a process for protecting organic materials which may be damaged by exposure to ultraviolet rays, from damage by ultraviolet irradiation, characterized in that an oxalic acid diamide derivative is incorporated with or applied to the surface of the materials to be protected or in front of said materials a filter layer is placed that contains such oxalic acid diamide derivative of the formula:

$Ar_1—NH—CO—CO—B_1$ in which $Ar_1$ represents a benzene or naphthalene residue, which may be substituted by phenyl, benzazolyl, cyclohexyl, benzoyloxy or aliphatic groups with not more than 20 carbon atoms, and wherein $B_1$ represents a residue of the partial formula—$NH—D_1$ or

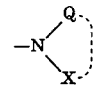

where $D_1$ stands for a possibly substituted alkyl group, alkenyl, hydroxyl, cycloalkyl, carboxylic or sulfonic acid group or a functional derivative thereof; Q represents a member selected from the group consisting of hydrogen, hydroxyalkyl, alkoxyalkyl and Q+W represents a piperidino and a morpholino residue and W stands for a member selected from the group consisting of hydroxyalkyl, alkoxyalkyl, acyl, a carboxylic group, a sulfonic acid group, a functional derivative thereof, a residue of the formula—$NHW_r$ (where $W_r$ is hydrogen, alkyl, acyl or phenyl), and an aminoalkyl group whose amino group may be alkylated, cycloalkylated or arylated.

NOVEL PHENYL AND NAPHTHALENE SUBSTITUTED OXALIC ACID DIAMIDES USEFUL AS PROTECTION AGENTS AGAINST ULTRAVIOLET IRRADIATION

Furthermore this invention relates to a specific group of novel compounds useful for the same purpose and corresponding to formula (4) and subordinated formula of the specification.

The present invention provides oxalic acid diamide derivatives having an asymmetrical structure insofar as the central oxazyl grouping is concerned and is based on the finding that a certain class of such compounds may be used as stabilizers against ultraviolet light for a wide variety of organic materials. Hence, an essential object of this invention is a process for protecting organic materials that may be damaged or destroyed by ultraviolet rays, characterized in that oxalic acid diamide derivatives are incorporated with such materials or applied to their surfaces or, in front of the material to be protected, a filter layer is interposed that contains such oxalic acid diamide derivatives of the formula:

1. Ar—NH—CO—CO—B in which Ar represents a 6- 10-membered aromatic carbocyle which may be substituted by aliphatic residues, an araliphatic or cycloaliphatic group, a phenyl radical, a residue containing a heterocycle consisting of five or six ring members, also by hydroxyl, phenoxy, nitro, aromatic acyloxy, amino groups or halogen atoms; B represents an aliphatic, araliphatic or alicyclic residue containing at least one nitrogen atom, or a nonaromatic amino function, this residue B being linked through a nitrogen atom with the attached —CO— group of the above formula and containing no more than 20 carbon atoms and being of a kind such that it does not displace the absorption maximum of the compound of the above formula to a value of more than 370 m$\mu$.

As will be understood from the foregoing, the symbol Ar represents above all the benzene or naphthalene residue (and over and above this, for example, also the tetrahydronaphthalene residue) which may be substituted e.g. by a very wide variety of aliphatic residues. These substituting residues may be not only alkyl or alkenyl groups but also their substitutive derivatives e.g. halogenoalkyl, carbalkoxyalkyl, alkoxyalkyl, hydroxyalkyl, nitroalkyl, aminoalkyl, carboxyalkyl and sulphonylalkyl groups. Very valuable aliphatic residues are also functionally modified hydroxyl groups such as alkoxy, alkenyloxy, acyloxy groups and functionally modified amino groups such as alkylamino, acylamino and alkenylamino groups. The above definition includes also carboxylic acid groups and their functional derivatives such as carboxylic acid ester groups, carboxylic acid amide groups and nitrile groups. Especially suitable araliphatic residues are those whose alkyl portion contains up to four carbon atoms, and among cycloalkyl groups the cyclohexyl group deserves in general special mention. Suitable heterocyclic residues include the benzazolyl, benztriazolyl and triazinyl residues.

In accordance with the above definition the residue B is to be of aliphatic nature insofar as its bond with the —NH—CO—CO— skeleton is concerned, that is to say that any aromatic substitution must take place via an aliphatic intermediate member (example: the benzyl group).

In the present context the term "nonaromatic amino function" designates the group —NH$_2$ the hydrozino and the hydroxylamino group, as well as the residues derived therefrom by substitution.

The condition that the grouping B must contain at least one nitrogen atom results from the fact that the final products should be diamide derivatives of oxalic acid of which in general compounds containing up to three nitrogen atoms in the residue B are suitable.

Preferred use is to be made of those processes for protecting organic materials in which oxalic acid diamide derivatives of the formula:

2. AR$_1$—NH—CO—CO—B$_1$ are used, in which Ar$_1$ represents a benzene or naphthalene residue which may be substituted by a phenyl, benzazolyl, a cyclohexyl, a possibly substituted benzoyloxy group, a nitro, amino, nitrile group or hydroxyl groups or halogen atoms or by aliphatic residues containing up to 20 carbon atoms, and B$_1$ represents a residue of the partial formula:

2a —NH—D$_1$ or (2b) 

in which D$_1$ stands for an alkyl radical containing one to 18 carbon atoms (which may be substituted by halogen atoms, hydroxyl, alkoxy, carboxyl, by carboxylic acid ester, amide or nitrile groups, by phenyl groups or by aliphatic or aromatic acyl groups) or for an alkenyl radical containing up to six carbon atoms, a cycloalkyl residue, a sulfonic or carboxylic acid group or a functional derivative thereof or a hydroxyl group; Q represents a hydrogen atom or a hydroxyalkyl or alkoxyalkyl group, or Q+W represents a piperidino or morpholino residue, and W stands for a hydrogen atom, a hydroxyalkyl, alkoxyalkyl, acyl group or a carboxylic or sulfonic acid group or a functional derivative thereof, for a residue —NHW$_x$ (where W$_x$ is hydrogen, alkyl, acyl or phenyl) or for an aminoalkyl group whose amino group may be alkylated, cycloalkylated or arylated.

Among the Ar$_1$ residues mentioned above, the term "-benzazolyl group" is above all the 2-benzoxazolyl, 2-benzthiazolyl or 2-benzimidazolyl group. "Aliphatic residues" designates above all linear or branched alkyl groups containing one to 18 carbon atoms or alkoxy groups with one to 18 carbon atoms, alkenyl or alkenyloxy groups containing one to four carbon atoms, phenoxy groups, alkoxy groups containing one to six carbon atoms (which may be substituted by halogen, alkoxy, nitrile or alkoxycarboxy groups), aliphatic acyloxy groups containing one to 18 carbon atoms or alkylamino groups containing one to eight carbon atoms.

Concerning the members mentioned above under D$_1$ as substituents for the alkyl groups it should be observed that in general they do not contain more than eight carbon atoms.

Functional derivatives of the carboxylic and sulfonic acid group (the salts of this group should be classed with the acid group itself) are preferably the aliphatic and aromatic esters (containing up to 18, in most cases up to six carbon atoms) and the amides (as well as substituted amides containing the same number of carbon atoms as mentioned for the esters).

Concerning the type and number of carbon atoms for the substituents represented by W the same applies as has been said above.

Within the definition of the formula (1) those oxalic acid diamide derivatives are of practical value which correspond to the formula:

3. Ar$_2$—NH—CO—CO—B$_2$ in which Ar$_2$ represents a naphthalene residue or a benzene residue which may be substituted by a phenyl group, alkyl groups containing one to 12 carbon atoms, alkoxy groups containing one to 12 carbon atoms, halogen atoms, halomethyl groups, carboxylic acid alkyl ester groups whose alkyl residue contains one to four carbon atoms, nitrile groups or sulfonamide groups: B$_2$ represents a residue of one of the partial formulas:

3a —NH—D$_2$
3b —NH—NH—W$_1$ (3c) 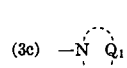  (3d) 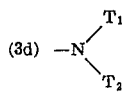

in which D$_2$ represents a hydrogen atom, an alkyl group containing one to 18 carbon atoms (which may be substituted by hydroxyl groups, alkoxy groups containing one to six carbon atoms, carboxylic acid or carboxylic acid alkyl ester groups containing one to four carbon atoms), an alkenyl group containing one to four carbon atoms, an aminoalkyl group whose alkyl residue contains one to eight carbon atoms (the hydrogen atoms of this amino group may themselves be substituted by alkyl groups containing one to four carbon atoms or the amino group may be represented by a morpholino group), a cyclohexyl group, a phenylalkyl group whose alkyl residue contains one to four carbon atoms, a methylene-imino group of the formula:

—N=CH—Ph in which Ph is a phenyl radical which may be substituted by alkyl, alkoxy or halogen; $T_1$ and $T_2$ each stands for an alkyl group containing one to four carbon atoms, $W_1$ for a hydrogen atom, a phenyl radical, a benzoyl radical, a cinnamoyl radical or a —CO—CO—NH— -phenylene-alkoxy group, and $Q_1$ stands for the complement to a piperidine or morpholine ring.

In the performance of the present invention it is also of value to use new oxalic acid diamides of the formula:

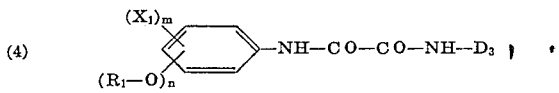

(4)

in which $R_1$ represents an alkyl group containing one to 18 carbon atoms, which may be substituted by chlorine atoms, hydroxyl, alkoxy groups containing one to four carbon atoms, carboxyl or nitrile groups, carboxylic acid amide or alkyl ester groups containing one to 12 carbon atoms, an alkenyl group containing three or four carbon atoms, a possibly chlorinated or alkylated benzyl group, an aliphatic acyl group containing up to 18 carbon atoms, a benzyl group which may be substituted by chlorine or by an alkyl group containing one to four carbon atoms; $X_1$ represents hydrogen, an alkyl group containing one to 12 carbon atoms, a halogen atom, a halogenoalkyl group, a sulfonic acid group, a phenyl group or a phenylalkyl group whose alkyl residue contains one to four carbon atoms, or two orthopositioned residues $X_1$ together form a fused-on 6-membered aromatic carbon ring; $m$ and $n$ each is 1 or 2, the sum $m+n$ being at most 3; $D_3$ represents a linear or branched, saturated alkyl residue containing up to 18 carbon atoms which may be substituted by hydroxyl groups, alkoxy groups containing one to eight carbon atoms, carboxyl groups, carboxylic acid ester groups (whose ester residue contains one to 12 carbon atoms), carboxylic acid amide groups, nitrile groups, sulfonic acid ester groups, or represents an alkenyl residue containing three or four carbon atoms, a benzyl group or a cyclohexyl group.

Among the residues $R_1$ of the above formula those are specially valuable in which $R_1$ is replaced by the symbol $R'_1$, which stands for an alkyl group containing one to 18 carbon atoms which may be substituted by chlorine atoms, hydroxyl groups or alkoxy groups containing one to four carbon atoms, for an allyl group, a benzyl group which may be substituted by chlorine or methyl, a carbomethoxyalkyl or carbethoxyalkyl group whose alkyl grouping contains one to six carbon atoms, an aliphatic acyl group containing one to 12 carbon atoms or for a benzoyl group which may carry chlorine or an alkyl group containing one to four carbon atoms.

Among the new oxalic acid diamide derivatives of the above definition those should be specially mentioned which correspond to the formula:

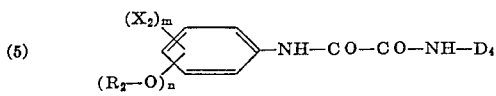

(5)

in which $R_2$ an alkyl group containing one to 12 carbon atoms; $X_2$ represents hydrogen, an alkyl group containing one to 12 carbon atoms, halogen, a carboxylic acid alkyl ester group whose alkyl residue contains one to four carbon atoms, a nitrile group, a sulfonamide group or a halomethyl group, and two orthopositioned residues $X_2$ together may form a fused-on benzene ring; $m$ and $n$ each is 1 or 2, the sum $m+n$ being at most 3; $D_4$ represents a linear or branched alkyl radical containing up to 18 atoms which may be substituted by hydroxyl groups, alkoxy groups containing up to six carbon atoms, carboxyl groups or morpholino groups, or is an alkenyl group containing one to four carbon atoms, a benzyl group or a cyclohexyl group.

Another group of compounds which may be used with advantage are the oxalic acid diamide derivatives of the formula:

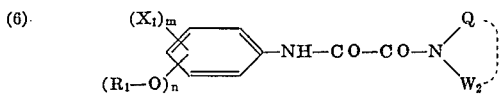

(6)

in which $R_1$ represents an alkyl group containing one to 18 carbon atoms which may be substituted by chlorine, hydroxyl groups, alkoxy groups containing one to four carbon atoms, carboxyl or nitrile groups, carboxylic acid amide or alkyl ester groups containing one to 12 carbon atoms, or an alkenyl group containing three or four carbon atoms, a benzyl group which may be chlorinated or alkylated, an aliphatic acyl group containing up to 18 carbon atoms, or is a benzoyl group which may be substituted by chlorine or an alkyl group containing one to four carbon atoms; $X_1$ represents hydrogen, an alkyl group containing one to 12 carbon atoms, a halogen atom, a halogenoalkyl group, a sulfonic acid group, a phenyl group or a phenylalkyl group whose alkyl residue contains one to four carbon atoms, or two orthopositioned residues $X_1$ together form a fused-on six-membered aromatic carbon ring; $m$ and $n$ each is 1 or 2, the sum $m+n$ being at most 3; Q represents a hydrogen atom or a hydroxyalkyl or alkoxyalkyl group or Q+$W_2$ represent a peperidino or morpholino residue and $W_2$ represents a hydrogen atom, a residue —NH$W_\nu$ (where $W_\nu$ represents hydrogen, alkyl containing one to eight carbon atoms, a group —CO—NH—Q' [where Q' is hydrogen or an alkyl radical containing one to eight carbon atoms ] or phenyl), an aminoalkyl group containing one to 18 carbon atoms (whose amino group may be alkylated), a sulfonic or carboxylic acid group or their functional derivatives, a hydroxyalkyl or alkoxyalkyl group or a group —CO—NH—Q' (where Q' is hydrogen or alkyl with one to eight carbon atoms).

Particularly valuable compounds within the definition of formula (4) correspond to the formula:

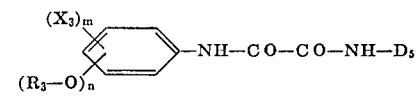

(7)

in which $X_3$ represents hydrogen or an alkyl group containing one to eight carbon atoms; $R_3$ represents an alkyl group containing one to 18 carbon atoms and $D_5$ an alkyl group containing one to 18 carbon atoms which may be substituted by a hydroxyl group, an alkoxy group containing one to eight carbon atoms, a carboxyl group or a functional derivative thereof, or an alkenyl group containing three or four carbon atoms, a cyclohexyl group or a benzyl group; $m$ and $n$ each is 1 or 2, the sum $m=n$ being at most 3.

From among the naphthylamide derivatives of the general formula (1) mentioned above the following subgroups may be cited:

a. Compounds of the formula:

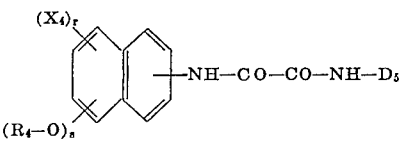

(8)

in which $X_4$ a hydrogen atom, a methyl group or a sulfonic acid group; $R_4$ stands for hydrogen or an alkyl group or acyl group containing one to 18 carbon atoms; $D_5$ represents an alkyl group containing one to 18 carbon atoms which may be substituted by a hydroxyl group, an alkoxy group containing one to eight carbon atoms, a carboxyl group or a functional derivative thereof, or is an alkenyl group containing three or four carbon atoms, a cyclohexyl group or a benzyl group; $r$ and $s$ each is 0 or 1, the sum $r+s$ being at most 1.

b. Compounds of the formula:

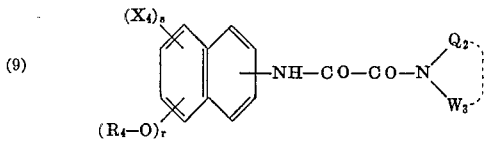

(9)

in which $X_4$ represents a hydrogen atom, a methyl group or a sulfonic acid group; $R_4$ for hydrogen or an alkyl or acyl group containing one to 18 atoms; $r$ and $s$ each is 0 or 1, the sum $r+s$ being at most 1; $Q_2$ represents a hydrogen atom or together with $W_3$ a piperidino or morpholino residue; $W_3$ is a hydrogen atom, a residue $-NHW_z$ ($w_z$ being hydrogen, alkyl with one to eight carbon atoms or phenyl), an aminoalkyl group containing one to 18 carbon atoms (whose amino group may be alkylated), a sulfonic or carboxylic acid group or a functional derivative thereof, a hydroxyalkyl or alkoxyalkyl group or a group $-CO-NH-Q'$ (where $Q'$ is hydrogen or an alkyl group containing one to eight carbon atoms).

Particularly good results in protecting organic materials, especially polymers based on polymers containing halogen (example:polyvinylchloride), on poly-α-olefins or on polymers of unsaturated polyesters and copolymerizable vinyl monomers have been achieved with compounds of the formula:

(10) 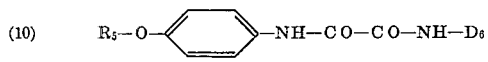

in which $R_5$ represents an alkyl group containing one to eight carbon atoms and $D_1$ an alkyl, hydroalkyl or alkoxyalkyl group containing one to 18 carbon atoms, an alkenyl group containing three or four carbon atoms, a carbalkoxy- (C 1 to 8) -alkyl (C 1 to 8) group or a benzyl group.

The new oxalic acid diamide derivatives may be prepared in a manner similar to the known methods. A preparatively important method—which is specially suitable for the manufacture of the new oxalic acid diamide derivatives of the formula (4)—consists in reacting an oxalic acid semiamide of the formula:

(11) 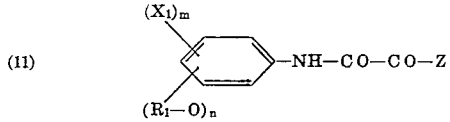

with an amine of the formula $-NH_2-D_3$, in which $X_1$, $R_1$, $D_3$, $m$ and $n$ the above meanings and Z stand for a hydroxyl group, a phenoxy group, an alkoxy group containing one to four carbon atoms or a halogen atom (preferably chlorine), at a temperature within the range from 0° to 200° C. and, if desired, in the presence of a solvent that is chemically inert towards the reactants. Any free hydroxyl groups in the benzene residue of this formula may be subsequently esterified or etherified.

Advantageously, this reaction is performed thus: When Z stands for a halogen atom, the reactants are reacted in approximately equimolecular proportions and in the presence of an acid acceptor, preferably a tertiary nitrogen base, in the presence of an inert solvent, at a temperature within the range from 0° to 80° C. On the other hand, when Z stands for a hydroxyl group, a phenoxy group or an alkoxy group, the reactants are reacted in approximately equimolecular proportions and in the presence of a catalyst, preferably boric acid, at a temperature ranging from 20° to 180° C.

Principally, the synthesis may also start from the other carboxyl function of oxalic acid, that is to say that an oxalic acid semiamide of the formula:

12.  $Z-CO-CO-NH-D_3$ may be reacted with an amine of the formula

(13) 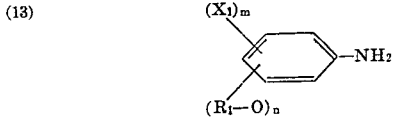

(in which Z, $D_3$, $X_1$, $R_1$, $m$ and $n$ have the above meanings) under substantially identical conditions.

However, the starting materials required for the last-mentioned variant of the manufacturing process are in general somewhat more difficult to prepare.

Either variant of the process may be carried out in the melt or preferably in the presence of a solvent that is inert towards the reactants; the temperature depends on the nature of the reaction medium. As a rule, the condensation is carried out at 50° to 150° C. When an inert solvent is used, it is advantageous to condense at the boiling temperature of the reaction mixture, while removing the alcohol or water to be eliminated azeotropically, Free hydroxyl groups present are then etherified or esterified in known manner. Suitable inert solvents are, for example, benzene, toluene and chlorobenzene, also those which boil above about 140° C., such as di- and trichlorobenzene, diethyleneglycol diethyl ether, high-boiling hydrocarbons such as para-cymene and others. According to a preferred process for the manufacture of the oxalic acid diamides of the formula (4) the carboxyl groups or carboxylate groups of the oxalic acid semiamide of the formula (11) are reacted with a primary amine of the formula $NH_2-D_3$ in the presence of anhydrous boric acid (in the melt or in the presence of an inert solvent) in an amount of 0.1 to 5 referred to the weight of the oxalic acid or its ester, at a temperature ranging from 100° to 160° C.

For the present process the following amines may be used, e.g. for forming the amide groupings defined sub Ar in formula (1), always within the framework of the requirements as expressed by formula (1):
Aniline, 2-chloraniline, 4-chloraniline, 3-chloraniline,
2,4-dichloraniline, 3,4-dichloraniline,
2,4,6-trichloraniline and the corresponding bromanilines,
2-fluoraniline, 3-fluoraniline, 4-fluoraniline,
2-iodaniline, 4-iodaniline,
3,5-diiodaniline,
2-methylaniline, 3-methylaniline, 4-methylaniline,
2,4-dimethylaniline, 2,5-dimethylaniline,
2,6-diethylaniline, 2-methyl-5-isopropylaniline,
2-methoxyaniline, 3-methoxyaniline, 4-methoxyaniline,
2,4-dimethoxyaniline, 2,5-dimethoxyaniline,
2,5-diethoxyaniline, 4-butoxyaniline,
3-trifluoromethylaniline, 3,5-bis-trifluoromethylaniline,
4-nitroaniline, 2-nitraniline, 3-nitraniline,
3-hydroxyaniline, 4-hydroxyaniline, 2-aminodiphenyl,
meta-aminoacetanilide, para-aminoacetanilide,
3-aminobenzoic and 4-aminobenzoic acid and their amides,
anthranilic acid and its methyl and ethyl esters.
para-amino-N,N-dimethylaniline,
4-aminomethylbenzoate, 4-aminoethylbenzoate,
methanilic acid, sulfanilic acid, metanilamide, sulfanilamide,
4-hydroxy-3,5-di-tertiary butylaniline,
4-hydroxy-3,5-dichloraniline, 4,5-dichlorsulfanilic acid,
2-methoxy-5-meta-methylaniline, 4-methyl-3-chloraniline,
2-chloro-4-trifluoromethylaniline, 2,4-dimethoxy-5-chloraniline and
2,4-dimethyl-6-nitraniline.

As suitable naphthylamines the following may be mentioned:
α-naphthylamine, β-naphthylamine,
sulfonic acids of the naphthylamines, such as
1-naphthylamine-4-, -5-and -8-sulfonic acid,
2-naphthylamine-1- and -5-sulfonic acid,
2-naphthylamine-4,8- and -6,8-disulfonic acid.
8-hydroxy-1-naphthylamine-4-sulfonic acid,
8-hydroxy-2-naphthylamine-6-sulfonic acid,
8-hydroxy-1-naphthylamine-4,6-disulfonic acid,
8-hydroxy-1-naphthylamine-3,6-disulfonic acid,
8-hydroxy-2-naphthylamine-3,6-disulfonic acid;
hydroxyamines in which a hydroxyl group in o-position to the amide nitrogen atom may be subsequently etherified;
2-hydroxyaniline,
2-hydroxy-5- and -4-phenylaniline,
2hydroxy -5-methylaniline, -5-chloraniline, -5-isooctylaniline, -5-dodecylaniline, -4-methoxyaniline,
2,4-dihydroxyaniline,
1-hydroxy-2-naphthylamine and
2-hydroxy-1-naphthylamine.

The oxalic acid diamides described above may be used in principle for stabilizing and protecting all organic materials that are in any from damaged or destroyed by ultraviolet rays. Such damages due to the same agency, namely ultraviolet irradiation, may have a wide variety of effects, for example changes in color, changes in the mechanical properties, (brittleness, fissuring, impairment of the tear or bending strength or rubbing resistance, elasticity, ageing), triggering off of undesired chemical reactions (decomposition of sensitive chemical substances e.g. medicaments, photochemically induced rearrangements, oxidation etc., for instance of oils containing unsaturated fatty acids), causing of burns and irritations (e.g. on human skin) and others. The use of the asymmetrical oxalic acid diamides described above is of special importance to the protection of polycondensates and polyadducts from the action of ultraviolet rays. In addition, a considerable number of the compounds to be used according to this invention act not only as agents affording protection from ultraviolet rays but display also a stabilizing effect against the action of oxygen and heat and possess also antistatic properties.

The organic materials to be protected may be in the most varied stages of processing and physical states, their common feature being their sensitivity towards ultraviolet rays.

As substances of low or high molecular weight that can be protected or stabilized by the present process there may be mentioned, without intending any restriction thereto, the following:

Organic natural substances as used in pharmacy (medicaments), ultraviolet sensitive dyestuffs; compounds which as victuals, or in victuals, are decomposed by exposure to light (unsaturated fatty acids in oils) and others.

As organic materials of high molecular weight there may be mentioned, for example:

I. Synthetic organic materials of high molecular weight, such as:
  a. Polymers based on organic compounds contain at least one polymerizable carbon-to-carbon double bond, that is to say homopolymers or copolymers and their after-treating products, for example products obtained by cross-linking, grafting or degradation; polymer dilutions, products obtained by modification of reactive groupings in the polymer molecule e.g. polymers based on $\alpha, \beta$-unsaturated carboxylic acids (e.g. acrylates, acrylamides, acrylonitrile), of olefinic hydrocarbons such as e.g. $\alpha$-olefins, ethylene, propylene or dienes, that is to say also rubbers and rubberlike polymers (also so-called ABS polymers), polymers based on vinyl or vinylidene compounds (e.g. styrene, vinyl esters, vinylchloride, vinyl alcohol), of halogenated hydrocarbons, of unsaturated aldehydes or ketones, allyl compounds and others; b. other polymers accessible e.g. by ring opening, for instance polyamides of the polycaprolactam type; formaldehyde polymers or polymers accessible by polyaddition as well as polycondensation, such as polyethers, polythioethers, polyacetals, thioplasts;
  c. polycondensates or precondensates based on bis- or polyfunctional compounds. with condensable groups, their homo- and cocondensates and after-treating products, for example: Polyesters [saturated (e.g. polyethylene terephthalate) or unsaturated e.g. maleic acid-dialcohol polycondensates and their cross-linked products with copolymerizable vinyl monomers) linear or branched (also those based on higher alcohols e.g. alkyd resins)], polyamides e.g. hexamethylenediamine adipate), maleinate resins, melamine resins, phenol resins (e.g. novolaks), aniline resins, furan resins, carbamide resins and their precondensates and similarly constituted products, polycarbonates, silicone resins and others.
  d. Polyadducts such as polyurethanes (cross-linked or not), epoxy resins.

II. Semisynthetic organic materials, e.g. cellulose esters or mixed esters (acetate, propionate), nitrocellulose, cellulose ethers, regenerated cellulose (viscose rayon, cuprammonium cellulose or their after-treating products, casein synthetics.

III. Natural organic materials of animal or vegetable origin, for example those based on cellulose or proteins such as wool, cotton, silk, bast, jute, hemp, furs and hairs, leathers, fine wood pulp, natural resins (such as colophony and especially lacquer resins), gelatin, glues; also rubber, guttapercha, balata and their after-treating and modification products, degradation products and products obtained by conversion of reactive groups.

The organic materials concerned, especially plastics of the types of polymers of vinylchloride, saturated and unsaturated polyesters, celluloses and polyamides, may be in the most varied stages of processing (raw materials, semifinished or finished products) and physical states. They may be products shaped in a wide variety of ways, that is to say e.g. as three-dimensional products such as sections, containers or various workpieces, chips or granulates, foamed products; predominantly two-dimensional flat structures such as films, foils, lacquers, impregnations and coatings or predominantly unidimensional products such as filaments, fibers, flocks, bristles or wires. The said materials may also be unshaped in the most varied homogeneous or inhomogeneous forms of distribution and physical states, being e.g. powders, solutions, normal and reversed emulsions (creams) dispersions, latices, sols, gels, putties, waxes, adhesives and sealing or grouting compositions.

Fibrous materials may be in the most varied, mainly nontextile, forms of processing being, for example, filaments, twisted yarns, fiber fleeces, felts, waddings, flocked materials or textile woven fabrics or laminated textiles, knitwear, papers, cardboards etc. The new stabilizers may also be used, for example, as follows:
  a. In cosmetic preparations such as perfumes, dyed or undyed soaps and bath salts, skin and face creams, powders, repellants and especially suntan oils and creams;
  b. in admixture with dyestuffs or pigments or as additives to dyebaths, printing, discharge or reserve pastes, and also for after-treating dyeings, prints or discharge prints;
  c. in admixture with so-called carriers, antioxidants, other light filters, heat stabilizers or chemical bleaches;
  d. in admixture with cross-linking agents, finishes such as starches or synthetic finishes;
  e. in combination with detergents. The detergents and stabilizers may, if desired, be added separately to the wash liquors;
  f. in gelatin layers for photographic purposes;
  g. in combination with polymers vehicles (polymers, polycondensates or polyadducts) in which the stabilizers are incorporated in the dissolved or dispersed state, if desired in addition to other substances, for example in coating, impregnating or binding agents (solutions, dispersions, emulsions) for textiles, fleeces, papers, leathers;
  h. as additives to various industrial products to slow down their ageing e.g. as additive to glues, adhesives, paints or the like.

When textile organic materials of natural or synthetic origin e.g. textile fabrics, are to be protected according to this invention, the said material may be at any stage of its final processing, such as a finishing or anticrease finishing operation, a dyeing operation or other finishing operation, the new protective agents being applied thereto by way of a fixing operation similar to a dyeing process.

The new stabilizers of this invention are preferably added to or incorporated with the material before or while the latter is being shaped. Thus, for instance, they may be added to the moulding composition or injection moulding composition used for the manufacture of films, foils, tapes or shaped bodies or they may be dissolved, dispersed or in any other way finely distributed in the spinning solution before spinning it. The protective agents may also be added to the starting products, reaction mixtures or intermediates in the manufacture of fully synthetic of semisynthetic organic materials, hence also before or during the chemical reaction, for example in a polycondensation (also precondensates) a polymerization (also prepolymers) or a polyaddition.

One important variant of the application of the stabilizers of this invention is their incorporation in a protective layer used for protecting the material situated behind it. This can be achieved by applying the ultraviolet absorber to the surface layer (of a film, a fiber or a multidimensional shaped object), for example similar to a dyeing process, or the additive substance may be embedded in a polymer (or polycondensate or polyadduct film by any one of the methods conventionally employed in coating with polymeric coating products, or the active substance may be dissolved in a suitable solvent and allowed to diffuse or swell into the surface layer. In another important variant the ultraviolet absorber is embedded in a self-supporting, substantially two-dimensional substrate e.g. a foil or the wall of a container whereby ultraviolet rays are kept away from the substance behind the substrate. (Examples: Shop windows, films, transparent packages, bottles).

From the foregoing it will be clear that not only the substrate or vehicle incorporating the ultraviolet absorber is protected but also other ingredients of the substrate, for example dyes, antioxidants, disinfectants, antistatics and other finishes, plasticizers and fillers.

Depending on the kind of substance to be protected or stabilized, on its sensitivity or on the form of protecting or stabilizing the amount of stabilzer required may vary within wide limits, for example from about 0.01 to 10 percent of the weight of the substrate to be protected, but for most practical purposes about 0.05 to 2 percent will suffice.

Hence, as results from the foregoing the process for protecting organic materials from the action of ultraviolet irradiation and heat consists in that the oxalic acid diamides described are homogeneously distributed in the organic materials to be protected or the said materials are superficially coated with said absorbers or the said materials are coated with a filter layer containing the compounds described.

More especially, it is advantageous to incorporate the oxalic acid diamides described in homogeneous from in substance, as a solution or dispersion, with the organic material to be protected in an amount of 0.1 to 10 percent, preferably 0.2 to 2.0 percent of the weight of the material to be protected before the latter is finally shaped.

When the new protecting compound is to be applied to the surface of the substrate to be protected, e.g. a fibrous material (fabric), this is advantageously done by immersing the substrate in a liquor in which the ultraviolet absorber is dissolved or dispersed. Suitable solvents are, for example, methanol, acetone, ethyl acetate, methylethyl ketone, cyclohexanol and especially water. As is done in a dyeing process, the material to be treated is left in the liquor for some time (generally, 10 minutes to 24 hours will suffice) at 10° to 120° C., during which, if desired, the liquor may be agitated, and the material is then rinsed, if desired washed, and dried, In many cases it is advantageous to use the light filters described above in combination with sterically hindered phenols, esters of thiodipropionic acid or organic phosphorus compounds.

Unless otherwise indicated, parts and percentages in the following Manufacturing Instruction and Examples are by weight. M.p. stands for melting point.

MANUFACTURING INSTRUCTION 11.15 parts of the compound of the formula:

(14)   $CH_3O-\langle\phantom{x}\rangle-NH-CO-COOC_2H_5$

[prepared from p-anisidine and oxalic acid diethyl ester in the presence of a catalytic amount of boric acid at 110° to 120° C., while continuously distilling off the alcohol formed] are dissolved with heating in 100 parts of methanol, 10 parts of n-dodecylamine are added and the whole is stirred and refluxed for 1 hour, and then cooled to room temperature. The precipitated product of the formula:

(15)   $CH_3O-\langle\phantom{x}\rangle-NH-CO-CO-NHC_{12}H_{25}$ is suctioned off and washed with 50 parts of methanol. Yield: 17.6 parts (=97 percent of theory). M.p. 140° to 141° C. (from chlorobenzene+methanol).

| $C_{21}H_{34}N_2O_3$ | calculated: | C 69.58 | H 9.45 | N 7.73 |
|---|---|---|---|---|
| | found: | C 69.62 | H 9.58 | N 7.84 |

The compounds listed in the following tables were manufactured in a similar manner, the reaction time being determined in each case by observing the reaction on thin-layer chromatograms. Depending on the solubility of the individual product in methanol the product must be precipitated with water and washed on completion of the reaction.

In the following table:

Column    I = formula number
Column    II = structural formula or partial formula of the residue R in the preceding general formula
Column    III = melting point in °C. (uncorrected)
     *) = with decomposition IV = analytical data: C H N
         upper line = calculated
         lower line = found

(16)   $CH_3O-\langle\phantom{x}\rangle-NH-CO-CO-R$

| I | II | III | IV | | |
|---|---|---|---|---|---|
| 17 | R=—NHCH₃ | 211–212 | 57.68 | 5.81 | 13.46 |
| | | | 57.88 | 5.72 | 13.55 |
| 18 | R=—NHC₂H₅ | 184–185 | 59.45 | 6.35 | 12.60 |
| | | | 59.28 | 6.29 | 12.74 |
| 19 | R=—NHC₄H₉ | 154–155 | 62.38 | 7.25 | 11.19 |
| | | | 62.31 | 7.18 | 11.04 |
| 20 | R=—NHC₈H₁₇ | 143–144 | 66.64 | 8.55 | 9.14 |
| | | | 66.67 | 8.48 | 9.16 |
| 21 | R=—NHC₁₈H₃₇ | 135–136 | 72.60 | 10.38 | 6.27 |
| | | | 72.74 | 10.30 | 6.50 |
| 22 | R=—NH—⟨H⟩ | 230–231 | 65.19 | 7.30 | 10.14 |
| | | | 65.15 | 7.24 | 10.10 |
| 23 | R=—NHCH₂CH(C₂H₅)(C₄H₉) | 148–149 | 66.64 | 8.55 | 9.14 |
| | | | 66.73 | 8.48 | 9.05 |
| 24 | R=—NHCH₂C(CH₃)=CH₂ | 180–181 | 62.89 | 6.50 | 11.28 |
| | | | 62.72 | 6.61 | 11.49 |

| I | II | III | IV | | |
|---|---|---|---|---|---|
| 25 | R=—N(CH₃)(CH₃)·H₂O | 172.5–173.5 | 54.99 / 54.60 | 6.71 / 6.49 | 11.66 / 11.77 |
| 26 | R=—N(C₂H₅)(C₂H₅)·H₂O | 155.5–156.5 | 58.19 / 58.20 | 7.51 / 7.44 | 10.44 / 10.16 |
| 27 | R=—NHCH₂CH₂OH | 189.5–190.5 | 55.45 / 55.46 | 5.92 / 5.86 | 11.76 / 11.84 |
| 28 | R=—NHCH₂CH₂OCH₂CH₃ | 148–149 | 58.63 / 58.85 | 6.81 / 6.76 | 10.52 / 10.58 |
| 29 | R=—NHCH₂CH₂CH₂COOH·H₂O | *172–173 | 52.34 / 52.43 | 6.08 / 6.25 | 9.39 / 9.78 |
| 30 | R=—NHCH₂—C₆H₅ | 198–199 | 67.59 / 67.48 | 5.67 / 5.51 | 9.85 / 10.03 |
| 31 | R=—NH₂ | 246–247 | 55.66 / 55.60 | 5.19 / 5.26 | 14.43 / 14.52 |
| 32 | R=—NHNH₂ | 237–238 | 51.67 / 51.73 | 5.30 / 5.41 | 20.09 / 20.30 |
| 33 | R=—NHNH—C₆H₅ | *246–251 | 63.15 / 63.29 | 5.30 / 5.36 | 14.73 / 14.85 |
| 34 | R=—NHCH₂CH₂CH₂N(CH₃)(CH₃) | 142–143 | 60.19 / 60.42 | 7.58 / 7.72 | 15.04 / 15.08 |
| 35 | R=—N(piperidino) | 102–103 | 64.10 / 63.80 | 6.92 / 6.82 | 10.68 / 10.94 |
| 36 | R=—N(morpholino) | 89–90.5 | 59.08 / 59.05 | 6.10 / 6.12 | 10.60 / 10.79 |
| 37 | R=—HN—HC(CH₂—H₂C)(CH₂—H₂C)CH₂ (cyclohexyl) | 230–231 | 65.19 / 65.15 | 7.30 / 7.29 | 10.14 / 10.10 |

(38) C₈H₁₇O—C₆H₄—NH—CO—CO—R

| I | II | III | IV | | |
|---|---|---|---|---|---|
| 39 | R=—NHCH₃ | 179–180 | 66.64 / 66.57 | 8.55 / 8.49 | 9.14 / 8.96 |
| 40 | R=—NHC₂H₅ | 164–165 | 67.47 / 67.72 | 8.81 / 8.73 | 8.74 / 8.85 |
| 41 | R=—NHC₄H₉ | 159–160 | 68.93 / 68.84 | 9.26 / 9.16 | 8.04 / 8.13 |
| 42 | R=—NHC₈H₁₇ | 141–142 | 71.24 / 71.02 | 9.97 / 9.87 | 6.92 / 6.97 |
| 43 | R=—NHC₁₂H₂₅ | 135.5–136.5 | 73.00 / 73.01 | 10.50 / 10.24 | 6.08 / 5.96 |
| 44 | R=—NHC₁₈H₃₇ | 129–130 | 74.95 / 75.28 | 11.10 / 10.89 | 5.14 / 5.10 |
| 45 | R=—NHCH₂—C₆H₅ | 153–154 | 72.22 / 72.48 | 7.91 / 8.07 | 7.32 / 7.41 |
| 46 | R=—NH—C₆H₁₁ | 180–181 | 70.55 / 70.40 | 9.15 / 9.09 | 7.48 / 7.64 |
| 47 | R=—NHCH₂CH₂OH | 169–170 | 64.26 / 64.00 | 8.30 / 8.21 | 8.33 / 8.26 |
| 48 | R=—NH₂ | 219–220 | 65.72 / 65.91 | 8.27 / 8.48 | 9.58 / 9.57 |
| 49 | R=—NHNH—C₆H₅ | 186–187 | 68.90 / 68.98 | 7.62 / 7.60 | 10.96 / 10.83 |
| 50 | R=—NHNH₂ | 204–205 | 62.52 / 62.67 | 8.20 / 8.22 | 13.67 / 13.59 |
| 51 | R=—NHCH₂CH(C₂H₅)(C₄H₉) | 130–131 | 71.24 / 71.37 | 9.97 / 10.05 | 6.92 / 6.80 |

3,626,008

| I | II | III | IV |
|---|---|---|---|
| (52) | naphthalen-2-yl—NH—CO—CO—R | | |

| I | II | III | IV | | |
|---|---|---|---|---|---|
| 53 | R=—NHCH₃ | 252.5–254 | 68.41<br>68.31 | 5.30<br>5.41 | 12.27<br>12.26 |
| 54 | R=—NHC₂H₅ | 213–214 | 69.40<br>69.40 | 5.83<br>5.99 | 11.56<br>11.36 |
| 55 | R=—NHC₄H₉ | 152–154 | 71.09<br>70.90 | 6.71<br>6.78 | 10.36<br>10.40 |
| 56 | R=—NHC₁₂H₂₅ | 136–137 | 75.35<br>75.17 | 8.96<br>8.92 | 7.32<br>7.28 |
| 57 | R=—N(piperidinyl) | 122–123 | 72.32<br>72.11 | 6.43<br>6.47 | 9.92<br>9.89 |
| 58 | R=—NHCH₂CH₂OCH₂CH₃ | 157.5–158.5 | 67.11<br>67.13 | 6.34<br>6.30 | 9.78<br>9.80 |
| 59 | R=—HN—(cyclohexyl H) | 221–223 | 72.95<br>73.28 | 6.80<br>6.83 | 9.45<br>9.50 |
| 60 | R=—NH₂ | 252–254 | 67.28<br>67.13 | 4.71<br>4.77 | 13.08<br>13.06 |
| 61 | R=—NHCH₂CH(C₂H₅)(C₄H₉) | 156.5–157.5 | 73.59<br>73.67 | 8.03<br>7.96 | 8.58<br>8.77 |
| 62 | R=—NHCH₂CH₂CH₂N(CH₃)(CH₃) | 148–149 | 68.20<br>68.36 | 7.07<br>7.05 | 14.04<br>14.03 |

| I | II | III | IV |
|---|---|---|---|
| (63) | naphthalen-1-yl—NH—CO—CO—R | | |

| I | II | III | IV | | |
|---|---|---|---|---|---|
| 64 | R=—NHC₂H₅ | 169–170 | 69.40<br>69.47 | 5.83<br>5.96 | 11.56<br>11.30 |
| 65 | R=—NHC₁₈H₃₇ | 107.5–108.5 | 77.20<br>77.25 | 9.94<br>9.82 | 6.00<br>5.87 |
| 66 | R=—N(piperidinyl) | 109.5–110.5 | 67.59<br>67.61 | 5.67<br>5.58 | 9.85<br>9.72 |
| 67 | R=—NHNH₂ | 202–203 | 62.87<br>62.83 | 4.84<br>4.92 | 18.33<br>18.48 |
| 68 | R=—NHCH₂CH(C₂H₅)(C₄H₉) | 118–119 | 73.59<br>73.68 | 8.03<br>8.02 | 8.58<br>8.75 |
| 69 | R=—NHCH₂CH₂CH₂N(CH₃)(CH₃) | 113–114 | 68.20<br>67.98 | 7.07<br>7.00 | 14.04<br>14.10 |

| I | II | III | IV |
|---|---|---|---|
| (70) | (4-CH₃, 2-OCH₃-phenyl)—NH—CO—CO—R | | |

| I | II | III | IV | | |
|---|---|---|---|---|---|
| 71 | R=—NHCH₃ | 184–185 | 59.45<br>59.61 | 6.35<br>6.24 | 12.60<br>12.56 |
| 72 | R=—NHC₈H₁₇ | 92–93.5 | 67.47<br>67.66 | 8.81<br>8.92 | 8.74<br>8.87 |
| 73 | R=—NHCH₂CH₂OCH₂CH₃ | 113–114 | 59.98<br>59.84 | 7.19<br>7.05 | 9.99<br>10.07 |

| I | II | III | IV | | |
|---|---|---|---|---|---|
| 74 | R=—NHCH$_2$—C$_6$H$_5$ | 167–168.5 | 68.44<br>68.34 | 6.08<br>5.99 | 9.39<br>9.45 |
| 75 | R=—NHCH$_2$CH(C$_2$H$_5$)C$_4$H$_9$ | 61–63 | 67.47<br>67.36 | 8.81<br>8.70 | 8.74<br>8.81 |

(76)  C$_2$H$_5$O—C$_6$H$_4$—NH—CO—CO—R

| I | II | III | IV | | |
|---|---|---|---|---|---|
| 77 | R=—NHCH$_3$ | 220–222 | 59.45<br>59.70 | 6.35<br>6.45 | 12.60<br>12.72 |
| 78 | R=—NHC$_2$H$_5$ | 192–193 | 61.00<br>60.81 | 6.83<br>6.76 | 11.86<br>11.74 |
| 79 | R=—NHC$_4$H$_9$ | 175–176 | 63.61<br>63.85 | 7.63<br>7.68 | 10.60<br>10.59 |
| 80 | R=—NHC$_8$H$_{17}$ | 155–156 | 67.47<br>67.22 | 8.81<br>8.55 | 8.74<br>8.95 |
| 81 | R=—NHC$_{12}$H$_{25}$ | 146–147 | 70.17<br>70.05 | 9.64<br>9.56 | 7.44<br>7.56 |
| 82 | R=—NHC$_{18}$H$_{37}$ | 138–139 | 73.00<br>72.83 | 10.50<br>10.44 | 6.08<br>6.21 |
| 83 | R=—N(piperidino) | 122–123 | 65.19<br>65.42 | 7.30<br>7.26 | 10.14<br>10.35 |
| 84 | R=—N(morpholino) | 117–118 | 60.42<br>60.51 | 6.52<br>6.53 | 10.07<br>10.11 |
| 85 | R=—NHCH$_2$CH$_2$OH | 193–194 | 57.13<br>57.12 | 6.39<br>6.35 | 11.11<br>11.31 |
| 86 | R=—NHCH$_2$C(=CH$_2$)CH$_3$ | 180–181 | 64.10<br>64.34 | 6.92<br>6.83 | 10.68<br>10.86 |
| 87 | R=—NH—CH$_2$—C$_6$H$_5$ | 196–197 | 68.44<br>68.73 | 6.08<br>6.08 | 9.39<br>9.50 |
| 88 | R=—NH—C$_6$H$_{11}$ | 222–223 | 66.14<br>66.18 | 7.44<br>7.64 | 9.73<br>9.65 |
| 89 | R=—NH$_2$ | 244–245.5 | 57.68<br>57.78 | 5.81<br>5.81 | 13.46<br>13.55 |
| 90 | R=—NHNH$_2$ | 227–228 | 53.80<br>53.99 | 5.87<br>5.80 | 18.83<br>19.08 |
| 91 | R=—NHNH—C$_6$H$_5$ | 238–239 | 64.20<br>64.46 | 5.72<br>5.81 | 14.04<br>14.05 |
| 92 | R=—NHCH$_2$CH(C$_2$H$_5$)C$_4$H$_9$ | 171–172 | 67.47<br>67.73 | 8.81<br>8.75 | 8.74<br>9.01 |
| 93 | R=—NHCH$_2$CH$_2$CH$_2$—N(CH$_3$)$_2$ | 161–162 | 61.41<br>61.32 | 7.90<br>7.67 | 14.33<br>14.61 |
| 94 | R=—NHCH$_2$CH$_2$CH$_2$—N(C$_2$H$_5$)$_2$ | 126–127 | 63.52<br>63.79 | 8.47<br>8.47 | 13.07<br>13.12 |
| 95 | R=—NHCH$_2$CH$_2$CH$_2$—N(morpholino) | 138–139 | 60.88<br>61.24 | 7.51<br>7.32 | 12.53<br>12.52 |
| 96 | R=—NH—NH—CO—C$_6$H$_5$ | 228–230 | 62.37<br>62.14 | 5.24<br>5.20 | 12.84<br>12.88 |
| 97 | R=—NHNHCOCH=CH—C$_6$H$_5$ · ½H$_2$O | 263–264 | 63.49<br>63.66 | 5.51<br>5.20 | 11.69<br>11.73 |
| 98 | R=—NHN=CH—C$_6$H$_5$ | 263–264 | 65.58<br>65.61 | 5.50<br>5.42 | 13.50<br>13.75 |
| 99 | R=—NHNHCOCONH—C$_6$H$_4$—OC$_2$H$_5$ | 353–354 | 57.96<br>58.06 | 5.35<br>5.36 | 13.52<br>13.54 |

| I | II | III | IV | | |
|---|---|---|---|---|---|

(100)

CH₃O—⟨benzene ring with OCH₃⟩—NH—CO—CO—R

| I | II | III | IV | | |
|---|---|---|---|---|---|
| 101 | R=—NHCH₃ | 164–165 | 55.45<br>55.66 | 5.92<br>5.76 | 11.76<br>11.92 |
| 102 | R=—NHC₁₈H₃₇ | 88–89 | 70.55<br>70.80 | 10.15<br>9.55 | 5.88<br>5.83 |
| 103 | R=—NHCH₂CH₂OH | 117–118 | 53.72<br>53.93 | 6.01<br>5.88 | 10.44<br>10.39 |
| 104 | R=—NHCH₂C(CH₃)=CH₂ | 111–112 | 60.42<br>60.57 | 6.52<br>6.69 | 10.07<br>9.95 |
| 105 | R=—NH₂ | 203–204.5 | 53.57<br>53.65 | 5.39<br>5.30 | 12.50<br>12.56 |
| 106 | R=—NHCH₂CH₂CH₂—N(CH₃)₂ | 89–90 | 58.23<br>58.39 | 7.49<br>7.59 | 13.58<br>13.63 |
| 107 | R=—NHCH₂CH(C₂H₅)(C₄H₉) | 63–64 | 64.26<br>64.22 | 8.39<br>8.58 | 8.33<br>8.52 |

(108)

⟨benzene ring with OCH₃⟩—NH—CO—CO—R

| I | II | III | IV | | |
|---|---|---|---|---|---|
| 109 | R=—NHCH₃ | 148–149 | 57.68<br>57.58 | 5.81<br>5.97 | 13.46<br>13.53 |
| 110 | R=—NHCH₂CH₂OH | 119–120 | 55.45<br>55.63 | 5.92<br>6.13 | 11.76<br>11.80 |
| 111 | R=—NHC₁₂H₂₅ | 73–74 | 69.58<br>69.60 | 9.45<br>9.29 | 7.73<br>7.58 |
| 112 | R=—NHC₁₈H₃₇ | 87.5–88.5 | 72.60<br>72.71 | 10.38<br>10.27 | 6.27<br>6.28 |
| 113 | R=—NH₂ | 198–199 | 55.66<br>55.72 | 5.19<br>5.32 | 14.43<br>14.31 |
| 114 | R=—NHCH₂C(CH₃)=CH₂ | 139–140 | 62.89<br>62.93 | 6.50<br>6.38 | 11.28<br>11.25 |
| 115 | R=—NHCH₂CH₂CH₂—N(CH₃)₂ | 68–69 | 60.19<br>60.35 | 7.58<br>7.40 | 15.04<br>14.82 |

(116)

Cl—⟨benzene ring with CH₃ and OCH₃⟩—NH—CO—CO—R

| I | II | III | IV | | |
|---|---|---|---|---|---|
| 117 | R=—NHC₂H₅ | 174–175 | 53.24<br>53.43 | 5.59<br>5.58 | 10.35<br>10.26 |
| 118 | R=—NHC₁₂H₂₅ | 95.5–96 | 64.29<br>64.19 | 8.58<br>8.50 | 6.82<br>6.62 |
| 119 | R=—NHNH₂ | 234–235 | 46.61<br>46.66 | 4.69<br>4.86 | 16.31<br>16.46 |
| 120 | R=—NHCH₂CH₂OH | 184.5–185.5 | 50.27<br>50.39 | 5.27<br>5.56 | 9.77<br>9.84 |
| 121 | R=—NHCH₂C(CH₃)=CH₂ | 144–144.5 | 56.66<br>56.50 | 5.77<br>5.81 | 9.44<br>9.70 |
| 122 | R=—NHCH₂CH₂CH₂—N(CH₃)₂ | 95–95.5 | 54.96<br>55.10 | 6.76<br>6.93 | 12.82<br>12.59 |

| I | II | III | IV | | |
|---|---|---|---|---|---|
| 123 | R=—NHCH₂CH₂CH₂—N⟨_O⟩ | 117–117.5 | 55.21<br>55.44 | 6.54<br>6.65 | 11.36<br>11.20 |

(124)

$$\text{H}_3\text{C}-\underset{\underset{\text{OC}_2\text{H}_5}{|}}{\bigcirc}-\text{NH—CO—CO—R}$$

| I | II | III | IV | | |
|---|---|---|---|---|---|
| 125 | R=—NHCH₃ | 172–173 | 61.00<br>60.86 | 6.83<br>6.73 | 11.86<br>11.77 |
| 126 | R=—NHC₂H₅ | 113–114 | 62.38<br>62.14 | 7.25<br>7.13 | 11.19<br>11.22 |
| 127 | R=—NHC₈H₁₇ | 74–75 | 68.23<br>68.43 | 9.04<br>9.10 | 8.38<br>8.34 |
| 128 | R=—NHC₁₈H₃₇ | 84–85 | 73.37<br>73.19 | 10.62<br>10.32 | 5.90<br>6.00 |
| 129 | R=—NH₂ | 153–154 | 59.45<br>59.74 | 6.35<br>6.21 | 12.60<br>12.67 |
| 130 | R=—NHCH₂C(CH₃)=CH₂ | 92–93 | 65.19<br>65.35 | 7.30<br>7.22 | 10.14<br>10.22 |
| 131 | R=—NHNH₂ | 146.5–147.5 | 55.68<br>55.93 | 6.37<br>6.35 | 17.71<br>17.62 |
| 132 | R=—NHCH₂CH(C₂H₅)(C₄H₉) | 64–65 | 68.23<br>68.49 | 9.04<br>8.95 | 8.38<br>8.33 |

(133)

$$\underset{}{\bigcirc}\overset{\text{OC}_2\text{H}_5}{\underset{\text{NH—CO—CO—R}}{}}$$

| I | II | III | IV | | |
|---|---|---|---|---|---|
| 134 | R=—NHC₈H₁₇ | 76–77 | 67.47<br>67.28 | 8.81<br>8.78 | 8.74<br>8.89 |
| 135 | R=—NHC₁₂H₂₅ | 66.5–67.5 | 70.17<br>70.25 | 9.64<br>9.46 | 7.44<br>7.52 |
| 136 | R=—NHC₁₈H₃₇ | 85–85.5 | 73.00<br>72.93 | 10.50<br>10.28 | 6.08<br>6.26 |
| 137 | R=—NH₂ | 148–149 | 57.68<br>57.82 | 5.81<br>5.82 | 13.46<br>13.39 |
| 138 | R=—NHCH₂C(CH₃)=CH₂ | 85–85.5 | 64.10<br>64.37 | 6.92<br>6.77 | 10.68<br>10.77 |
| 139 | R=—NHNH₂ | 155–156 | 53.80<br>54.06 | 5.87<br>5.84 | 18.83<br>18.97 |
| 140 | R=—NHCH₂CH₂CH₂—N(CH₃)₂ | 68.5–69 | 60.19<br>60.35 | 7.58<br>7.40 | 15.04<br>14.82 |

(141)

$$\text{H}_2\text{NO}_2\text{S}-\underset{}{\bigcirc}\overset{\text{OCH}_3}{\underset{\text{NH—CO—CO—R}}{}}$$

| I | II | III | IV | | |
|---|---|---|---|---|---|
| 142 | —NHC₈H₁₇ | 123–124 | 52.97 | 7.06 | 10.90<br>10.83 |
| 143 | —NHCH₂CH₂CH₂—N(CH₃)₂ | 184.5–185 | 46.92<br>46.82 | 6.19<br>6.15 | 15.63<br>15.24 |
| 144 | —NHCH₂CH(C₂H₅)(C₄H₉) | 128–129 | 52.97<br>53.27 | 7.06<br>7.09 | 10.90<br>10.75 |

| I | II | III | IV | | |
|---|---|---|---|---|---|
| 145 | 4-cyanophenyl-NHCOCONHCH$_2$CH$_2$CH$_2$N(CH$_3$)$_2$ | 174–175 | 61.29 / 61.47 | 6.61 / 6.79 | 20.43 / 20.41 |
| 146 | naphthyl-NHCO–CO–NH–CH$_2$CH$_2$CH$_2$–N(CH$_3$)$_2$ | 74–74.5 | 70.13 / 70.20 | 7.12 / 7.08 | 12.91 / 12.88 |
| 147 | naphthyl-NHCO–CO–NH–C$_8$H$_{17}$ | 76–77 | 74.96 / 74.89 | 8.01 / 7.87 | 7.95 / 7.76 |
| 148 | (CH$_3$)$_3$C–[C$_6$H$_3$(OC$_8$H$_{17}$)]–NHCOCONHC$_2$H$_5$ | 77–78.5 | 70.17 / 70.39 | 9.64 / 9.39 | 7.44 / 7.49 |
| 149 | (CH$_3$)$_3$C–[C$_6$H$_3$(OC$_8$H$_{17}$)]–NHCOCONHCH$_2$CH$_2$CH$_2$N(CH$_3$)$_2$ | 56–17 | 69.24 / 69.25 | 10.00 / 9.78 | 9.69 / 9.60 |
| 150 | Cl–[C$_6$H$_3$(CF$_3$)]–NHCOCONHCH$_2$CH$_2$CH$_2$–N(CH$_3$)$_2$ | 100.5–101.5 | 47.80 / 47.79 | 4.87 / 4.93 | 11.95 / 11.96 |
| 151 | Cl–[C$_6$H$_3$(CF$_3$)]–NHCOCONHCH$_2$CH$_2$CH$_2$–N(morpholino) | 142–143 | 48.80 / 48.65 | 4.86 / 4.87 | 10.67 / 10.57 |
| 152 | H$_5$C$_2$O–CO–C$_6$H$_4$–NHCOCONHCH$_2$–C(C$_2$H$_5$)((CH$_2$)$_3$–CH$_3$) | 151–152 | 65.52 / 65.30 | 8.10 / 8.10 | 8.04 / 8.20 |
| 153 | H$_5$C$_2$O–C$_6$H$_4$–NHCOCONH–C(CH$_2$OH)$_3$ | 170–172 | 53.84 / 53.95 | 6.45 / 6.45 | 8.97 / 9.18 |
| 154 | (OC$_8$H$_{17}$)(C(CH$_3$)$_3$)C$_6$H$_3$–NHCOCONH–C(CH$_2$OH)$_3$ | 104–105 | 63.69 / 63.47 | 8.91 / 8.73 | 6.19 / 6.21 |

EXAMPLES OF APPLICATIONS

In the following examples of applications typical representatives of each subgroup of compounds according to this invention were used in each case. In principle, all compounds mentioned in the preceding description as well as their equivalents are equally suitable, and all that has to be taken into consideration is the solubility of the individual compound in the substrate to be used; if necessary, this solubility can be determined by a small-scale experiment. It may also be necessary to take into consideration that the absorption maximum of the compound to be incorporated is changed by the substituents in the aromatic residue.

EXAMPLE 1

An acetylcellulose film, about 50µ thick, is produced by pouring a 10 percent acetonic solution of acetylcellulose, which contains 1 percent (referred to acetylcellulose) of the compound of formula (31). After drying, the following percentage values of the light permeability are obtained:

Wavelength in mµ | Permeability to light in % unexposed exposed for 100 hours in a fadeometer

| | | |
|---|---|---|
| 260 to 300 | 0 | 0 |
| 310 | 2 | 2 |
| 320 | 6 | 6 |
| 330 | 20 | 20 |
| 350 | 70 | 70 |

The compounds of the formulas, for example, 19, 24, 27, 36, 54, 60, 74, 103 and 105, produce similar results.

EXAMPLE 2

A paste of 100 parts of polyvinylchloride, 59 parts by volume of dioctylphthalate and 0.5 part of the compound of formula (17) is made on a calender at 145° to 150° C. into a foil about 0.5 mm. thick. The polyvinylchloride foil obtained in this manner absorbs within the ultraviolet region from 280 to 340 m$\mu$. When the foil is exposed in a fadeometer or subjected to the xeno test, it turns yellow and brittle much later than a blank control specimen.

Instead of the compound of the formula (7) there may be used, for example, any compound of the formulas 15, 18, 19, 20, 21, 22, 23, 24, 25, 27, 30, 32, 33, 35, 36, 39, 40, 41, 42, 43, 44, 45, 50, 55, 60, 61, 72, 73, 74, 75, 78, 80, 82, 84, 91, 92, 94, 95, 102, 104, 110, 111, 114, 117, 118, 120, 121, 123, 125, 127, 128, 129, 130, 131, 135, 137, 138, 139, 144, 150, or 151.

EXAMPLE 3

A mixture of 100 parts of polyethylene and 0.5 part of the compound of the formula (21) is rolled on a calender at 130° to 140° C. to form a foil which is then pressed at 150° C.

The polyethylene foil obtained in this manner is practically impermeable to ultraviolet light within the region from 280 to 340 m$\mu$.

Instead of the compound of the formula (21) there may be used, for example, a compound of one of the following formulas: 25, 26, 27, 29, 31, 32, 33, 43, 44, 50, 67, 75, 85, 89, 90, 91, 101, 105, 107, 113, 115, 119, 120, 132, 134, 135, 142, 143, 144, or 149.

EXAMPLE 4

A mixture of 100 parts of polypropylene and 0.5 part of one of the compound of the formulas: 15, 23, 26, 28, 34, 39, 40, 41, 42, 43, 44, 45, 46, 56, 57, 61, 62, 69, 72, 75, 78, 79, 80, 81, 82, 83, 84, 85, 88, 90, 92, 93, 94, 95, 102, 104, 107, 109, 111, 112, 114, 115, 117, 118, 121, 122, 123, 125, 127, 128, 129, 130, 131, 132, 134, 135, 136, 137, 140, 142, 144, 147, 148, 149, 150 or 151 is turned on a calender at 170° C. into a sheet which is then pressed at 230° to 240° C. under a maximum pressure of 40 kg./cm.$^2$ to form a panel 1 mm. thick.

The panels obtained in this manner are practically impermeable to ultraviolet light within the region from 280 to 340 m$\mu$.

EXAMPLE 5

Ten thousand parts of a polyamide in chip from, prepared from caprolactam in the usual manner, are mixed for 12 hours in a tumbler with 50 parts of the compound of the formula 20, 32, 42 or 56. The chips treated in this manner are then melted in a boiler heated at 300° C., from which the atmospheric oxygen has been displaced with superheated steam, and stirred for half an hour. The melt is then expressed under a nitrogen pressure of 5 atmospheres (gauge) through a spinneret and the filament is cooled and wound on a spinning bobbin, during which it is at the same time stretched.

The degradation of the macromolecules caused by exposure in a fadeometer and determined by measuring the relative viscosity in concentrated sulfuric acid is substantially inhibited by the addition of the above-mentioned compounds.

Other compounds listed in the table produce similar results

EXAMPLE 6

0.3 gram of the compound of the formula 19 is dissolved in 10 g. of pure olive oil which takes little time and requires no heating. A layer 50 $\mu$ thick of this solution absorbs ultraviolet light up to 340 m$\mu$.

In the same manner other fatty oils and creams or emulsions used for cosmetic purposes may be used for dissolving the above-mentioned or other compounds, e.g. those of the formula: 34, 44, 62, 72 or 79.

We claim:

1. An oxalic acid diamide derivative having the formula:

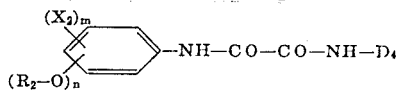

in which $R_2$ represents an alkyl group containing one to 12 carbon atoms; $X_2$ is hydrogen, an alkyl group containing one to 12 carbon atoms, chlorine, a $-SO_2NH_2$ group or a trifluoromethyl group, $m$ and $n$ each is 1 or 2 and the sum $m=n$ is at most 3: $D_4$ stands for a linear or branched alkyl radical containing one to 18 carbon atoms which may be substituted by one to three hydroxyl groups, one to three alkoxy groups containing one to six carbon atoms, or a carboxyl group, or is an alkenyl group containing three or four carbon atoms, a benzyl group or a cyclohexyl group.

2. An oxalic acid diamide derivative according to claim 1 in which $X_2$ represents a hydrogen atom or an alkyl group containing one to eight carbon atoms; $R_2$ represents an alkyl group containing one to 12 carbon atoms; $D_4$ stands for an alkyl group containing one to 18 carbon atoms which may be substituted by a hydroxyl group, an alkoxy group containing one to six carbon atoms, a carboxyl group or is an alkenyl group containing three or four carbon atoms, a cyclohexyl or benzyl group; $m$ and $n$ each is 1 or 2 and the sum $m=n$ is at most 3.

3. An oxalic acid diamide derivative having the formula:

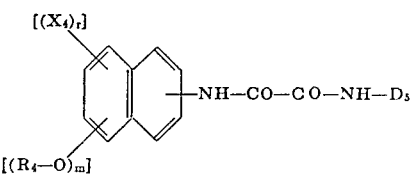

in which $D_5$ represents an alkyl group containing one to 18 carbon atoms which may be substituted by a hydroxyl group, an alkoxy group containing one to eight carbon atoms, or a carboxyl group, or represents an alkenyl group containing three or four carbon atoms, a cyclohexyl group or a benzyl group.

4. An oxalic acid diamide derivative according to claim 1 having the formula:

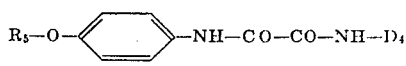

in which $R_5$ represents an alkyl group containing one to eight carbon atoms and $D_4$ represents an alkyl, hydroxyalkyl or alkoxyalkyl group containing one to 18 carbon atoms, an alkenyl group containing three or four carbon atoms, or a benzyl group.

* * * * *